US006502973B1

(12) United States Patent
Lam

(10) Patent No.: US 6,502,973 B1
(45) Date of Patent: Jan. 7, 2003

(54) VIBRATION DAMPING HEADLAMP MOUNTING SYSTEM

(75) Inventor: Chic H. Lam, New Baltimore, MI (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 09/880,489

(22) Filed: Jun. 14, 2001

(51) Int. Cl.[7] .................................................. B60Q 1/04
(52) U.S. Cl. ........................ 362/549; 362/369; 362/390
(58) Field of Search ................................ 362/274, 369, 362/390, 505, 546, 549, 368, 288

(56) References Cited

U.S. PATENT DOCUMENTS 1,435,763 A * 11/1922 Townsend ................... 362/274
1,536,407 A * 5/1925 Pettus ........................ 362/369
4,658,335 A * 4/1987 Culler ........................ 362/369

* cited by examiner

*Primary Examiner*—Y. My Quach-Lee
(74) *Attorney, Agent, or Firm*—David L. Kuhn; Gail S. Soderling; Clifford C. Carter

(57) ABSTRACT

A headlamp assembly for mounting a headlamp structure on a vehicle frame in a manner to minimize the vibration transmitted to the headlamp. The assembly includes an annular base member that is mounted to the vehicle frame with an opening sufficiently large to receive and surround the base of the headlamp structure without touching the base of the headlamp structure. A plurality of flat metal springs are attached by one end to the annular base at regular spaced intervals and the headlamp structure is attached to the other end of the shaped, flat springs. The springs hold the headlamp structure within the annular base substantially isolated from vibrations that would injure the filaments.

2 Claims, 1 Drawing Sheet

VIBRATION DAMPING HEADLAMP MOUNTING SYSTEM

GOVERNMENT INTEREST

The invention described here may be made, used and licensed to others by the United Sates Government for governmental purposes without paying me any royalty.

BACKGROUND OF THE INVENTION

1. Field of the Invention

In one aspect this invention relates to headlamp mounting structures. In a further aspect, this invention relates to a low vibration rate headlamp mounting for use on off road vehicles.

2. Prior Art

In general, military vehicles have unusual usage requirements. Therefore, they have evolved certain structural characteristics that are unique to the genre. In these vehicles, the headlamps and their supporting structure must allow normal highway travel yet be rugged enough to travel cross-country over substantial distances. Also, the lights must be mounted so they are suitably positioned with respect to the ground for both road and cross-country travel under combat conditions. One structural characteristic these vehicles have evolved is the mounting structure used with their headlights. To meet the operating requirements of the medium and heavy-duty trucks used in the military fleet, the headlamps are mounted low on the body. Because of the headlamps rugged, heavy structure, they have evolved to being mounted directly on the vehicle frame or bumper for many applications. This allows a solid mounting structure that adequately supports the headlamp's weight. Mounting the headlamps and associated structure directly on the vehicle frame makes for a solid mounting, but exposes the headlamps to substantial first and second order vibrations when the vehicle traverses rough terrain or roads. A second problem is engine vibration. The diesel engines used in the military fleet create continuous standing vibrations in the headlamps even when the truck is at idle. The result is headlamps mounted on frame or bumper members have filaments that are constantly subjected to vibration. The constant engine vibration combines with the shocks from vehicle operation to create a short filament life span. In many cases under peacekeeping or battle conditions, the headlamps are destroyed in less than two weeks. To the military this constant headlamp failure is a severe problem. It lowers readiness, increases maintenance costs, and increases risk to the soldier. It is an object of this invention to provide a headlamp mount that will isolate or substantially reduce the vehicle vibrations to the headlamp in such a manner as to extend the lamp's life while maintaining the standard military vehicle mounting characteristics.

SUMMARY OF THE INVENTION

Briefly, the present invention is a headlamp assembly for mounting a headlamp structure on a vehicle frame in a manner to minimize the vibration transmitted to the headlamp. The assembly includes an annular base member, which is mounted to the vehicle frame at the desired location and has an opening sufficiently large to receive and surround the base of the headlamp structure without touching the annular base. A plurality of flat metal springs is used; each spring has one end attached to the annular base. The springs are attached at regularly spaced intervals to the frame member. A headlamp structure is attached to the other end of the shaped, flat springs. The springs will hold the headlamp structure to the annular base and substantially isolate the headlamp from vibrations caused by vehicle operation that would injure the filaments.

DETAILED DESCRIPTION

Figure 1:
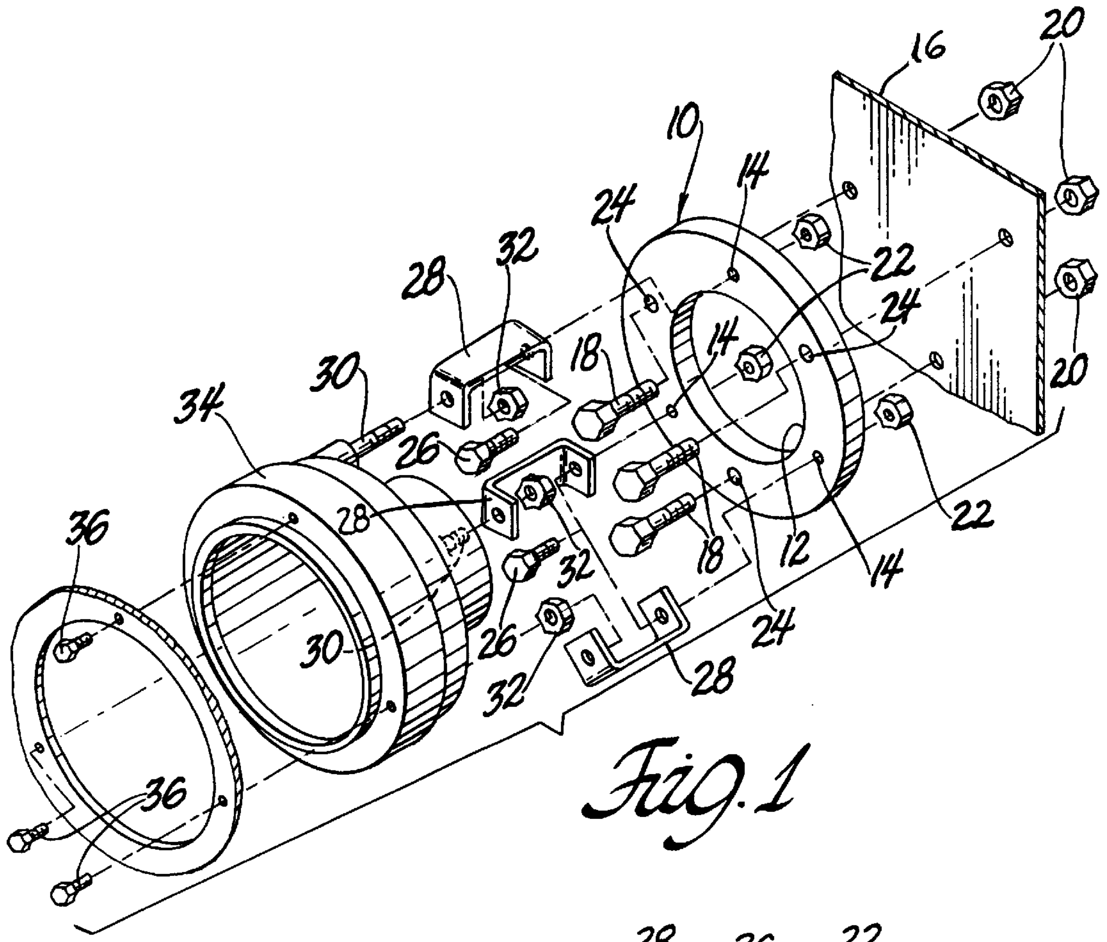
FIG. 1 is an exploded view of one structure according to this invention.
Figure 2:
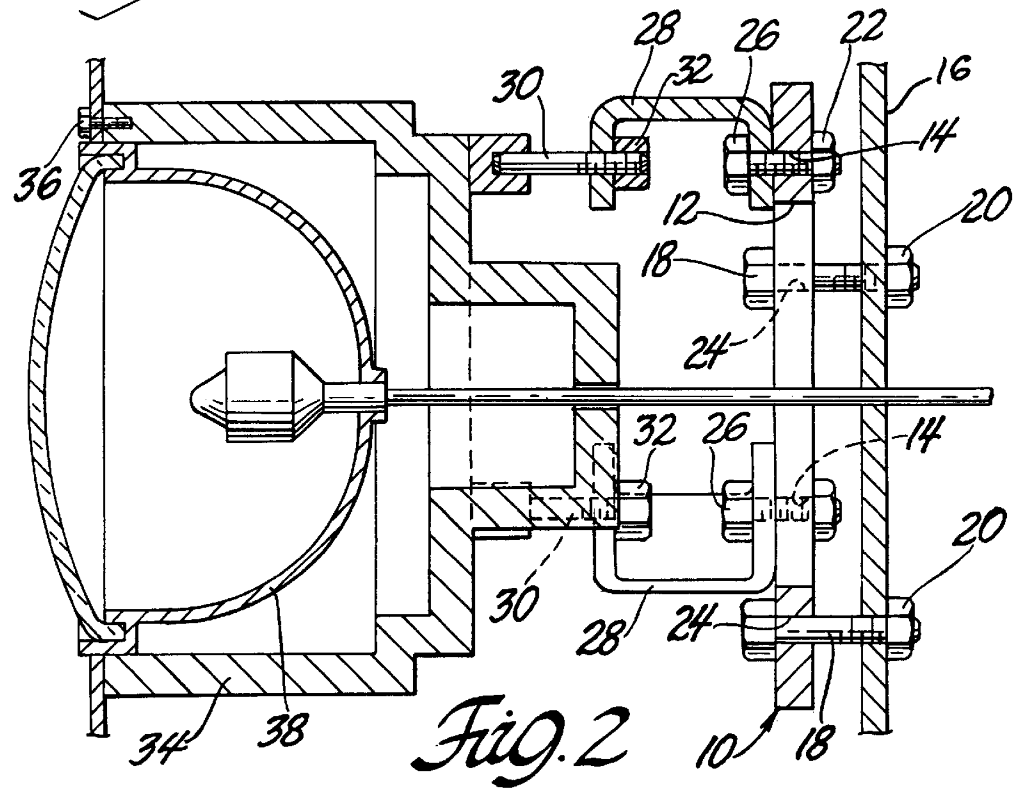
FIG. 2 is a side view in section of the assembly of FIG. 1.

Referring to the accompanying drawing in which like numerals refer to like parts and particularly to FIG. 1, a vibration damping headlamp assembly constructed in accordance with this invention is shown. An annular base member 10 is formed with a center opening 12 and a plurality of apertures circumferentially disposed about the rim. The apertures are divided into two sets, a first set of frame mounting apertures 24 which are for attaching the base member 10 to a vehicle frame 16 or bumper. The remainder of the vehicle is not shown since such structures are well known. A first set of threaded fasteners 18 are passed through the a apertures 24 in the annular base 10 and mated with complimentary threaded nuts 20 disposed on the opposite side of vehicle frame 16, to securely attach the base to the vehicle.

The annular base 10 has a second set of threaded fasteners 26 disposed in a second set of circumferentially disposed apertures 14 and mating with complimentary nuts 22. Each of the second set of threaded fasteners 26 also passes through an aperture in one leg of an associated U-shaped flat spring 28, there being one spring for each threaded fastener 26. When the complimentary nuts 22 are tightened, one leg of each U-shaped flat spring 28 will be firmly attached to the annular base 10. Tightening the first set of nuts 20 will draw the heads of bolts 18 towards the vehicle frame 16 holding the second set of nuts 22 securely in position. The remaining, second leg of the U-shaped flat spring will extend parallel to the first leg and is spaced apart from the first leg.

The second leg of U-shaped flat spring 28 has an aperture that receives a threaded stud 30 that extends from a headlamp housing 34. A complimentary nut 32 engages the stud 30 to attach the headlamp housing 34 firmly to U-shaped spring 28. A plurality of threaded fasteners 36 hold the headlamp structure 38 to the headlamp housing 34.

As shown, there are three of the U-shaped flat springs 28 circumferentially mounted on the annular base 10 at equal angles. It has been found that three or more flat U-shaped springs 28 can effectively support the headlamp housing 34 and isolate it from first and second order vibrations that tend to destroy the filaments of headlamp 38. In constructing the U-shaped springs 28 for heavy military transports headlamp assembly, it has been found that high carbon spring steel or high carbon stainless spring steel abut 0.015 to 0.025 inch thick, about 0.04 to 0.06 inch wide and having legs about 1.0 to 1.5 inch long make an acceptable flat, U-shaped spring. The legs will be formed so they are separated by about 0.35 to 0.5 inch so fasteners and legs do not interact due to the vibrations or displacement of the headlamp when the vehicle is operating under either normal or cross-country operating conditions. Springs made to this configuration will properly support the headlamp housing in coaxial alignment with the annular base member and reduce the vibration to an acceptable level that minimizes deleterious effects on the headlamp.

If a headlamp 34 were normally mounted directly to the vehicle frame 16 of a medium sized military truck, it will be vibrated at a frequency of about 4500 cycles per second with a 0.004 inch displacement. The displacement velocity will be approximately 0.225 inches per second. This degree of vibration is easily visible to an observer and results in a frequent headlamp failure. Conversely when mounted using the flat spring assembly of this invention using the dimensions above, the vibration was reduced to about 80–100 cycles per second, with 0.0005 inch displacement and 0.030 inches per second displacement velocity. This is approximately an 80% reduction in vibration. The resulting vibration is so reduced it is not normally perceptible to a human hand and headlamps show a normal operating life cycle for headlamps mounted on the body of the truck.

Various alterations and modifications will become apparent to those skilled in the art without departing from the scope and spirit of this invention and it is understood this invention is limited only by the following claims.

What is claimed is:

1. A headlamp mounting assembly for mounting a headlamp to the frame of a vehicle including:

an annular base member mounted on the vehicle frame;

a plurality of flat U-shaped metal springs, each of the U-shaped springs formed from high carbon steel with a thickness of about 0.015 to 0.025 inch, a width of about 0.04 to 0.06 inch and each of the legs is about 1.0 to 1.5 inch long the legs being separated about 0.35 to 0.5 inch, each spring having first and second free ends the first end of each of the U-shaped springs being attached to the annular base member, the U-shaped springs being disposed on the annular base member at regular, equally spaced intervals about the annular base member so as to provide an essentially constant spring rate along any radial direction; and a headlamp housing attached to the second free end of each U-shaped spring the U-shaped springs serving to hold the headlamp housing to the annular base member and serving to dampen vibratory energies applied to the housing to a level below that which adversely effects the headlamp filaments.

2. The headlamp mounting of claim 1 where the high carbon steel is stainless steel.

* * * * *